United States Patent
Coletta et al.

(10) Patent No.: US 6,230,958 B1
(45) Date of Patent: *May 15, 2001

(54) FRICTION PULL PLUG WELDING: DUAL CHAMFERED PLATE HOLE

(75) Inventors: Edmond R. Coletta, New Orleans; Mark A. Cantrell, Pearl River, both of LA (US)

(73) Assignee: Lockheed Martin Corporation, New Orleans, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/547,800

(22) Filed: Apr. 11, 2000

Related U.S. Application Data
(60) Provisional application No. 60/156,734, filed on Sep. 30, 1999.

(51) Int. Cl.⁷ .................................................. B23K 20/12
(52) U.S. Cl. .................... 228/114.5; 228/114; 228/112.1; 228/119
(58) Field of Search .............................. 228/114.5, 112.1, 228/119, 203, 2.1; 156/73.1; 428/940; 29/402.01; 1/402.18

(56) References Cited

U.S. PATENT DOCUMENTS

| | | |
|---|---|---|
| Re. 16,599 * | 4/1927 | Mattice . |
| 3,234,643 | 2/1966 | Hollander . |
| 3,444,611 * | 5/1969 | Bogart . |
| 3,487,530 * | 1/1970 | Ely . |
| 3,495,321 | 2/1970 | Shaff et al. . |
| 3,848,389 | 11/1974 | Gapp et al. . |
| 3,853,258 | 12/1974 | Louw et al. . |
| 3,973,715 | 8/1976 | Rust . |
| 4,087,038 | 5/1978 | Yagi . |
| 4,144,110 * | 3/1979 | Luc . |
| 5,460,317 | 10/1995 | Thomas et al. . |
| 5,469,617 * | 11/1995 | Thomas et al. . |
| 5,718,366 | 2/1998 | Colligan . |
| 5,971,252 * | 10/1999 | Rosen et al. . |
| 5,975,406 * | 10/1999 | Mahoney et al. . |
| 6,045,027 * | 4/2000 | Rosen et al. . |

FOREIGN PATENT DOCUMENTS

| | | |
|---|---|---|
| 447084 | 5/1929 | (DE) . |
| 575566 | 2/1946 | (GB) . |
| 660801 | 5/1979 | (SU) . |

OTHER PUBLICATIONS

"New Process to Cut Underwater Repair Costs", TWI Connect, No. 29, Jan. 1992.

"Innovator's Notebook", Eureka Transfer Technology, Oct. 1991, p. 13.

"Repairing Welds With Friction–Bonded Plugs", NASA Tech. Briefs, Sep. 1996, p. 95.

"Repairing Welds With Friction–Bonded Plugs", Technical Support Package, NASA Tech. Briefs, MFS–30102.

(List continued on next page.)

Primary Examiner—Patrick Ryan
Assistant Examiner—Colleen P. Cooke
(74) Attorney, Agent, or Firm—Garvey, Smith, Nehrbass & Doody, LLC

(57) ABSTRACT

Friction Pull Plug Welding (FPPW) is a solid state repair process for defects up to one inch in length, only requiring single sided tooling (OSL) for usage on flight hardware. Early attempts with FPPW followed the matching plug/plate geometry precedence of the successful Friction Push Plug Welding program, however no defect free welds were achieved due to substantial plug necking and plug rotational stalling. The dual chamfered hole has eliminated plug rotational stalling, both upon initial plug/plate contact and during welding. Also, the necking of the heated plug metal under a tensile heating/forging load has been eliminated through the usage of the dual chamfered plate hole.

19 Claims, 3 Drawing Sheets

OTHER PUBLICATIONS

"2195 Aluminum–Copper–Lithium Friction Plug Welding Development," AeroMat '97 Abstract.

"Welding, Brazing and Soldering", Friction welding section: "Joint Design", "Conical Joints", Metals Handbook: Ninth Edition, vol. 6, pp. 719–738.

* cited by examiner

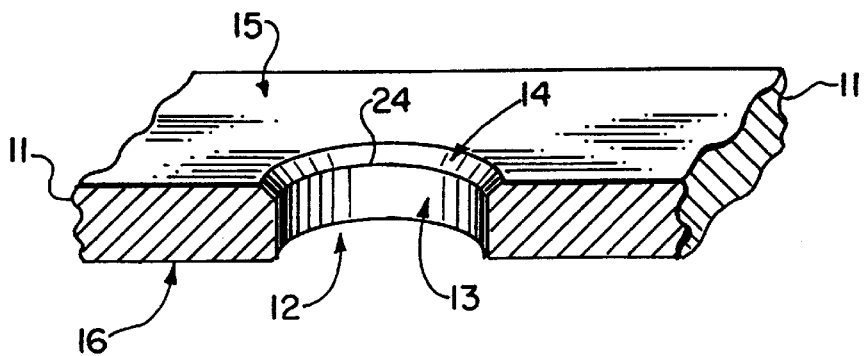
FIG. 1.
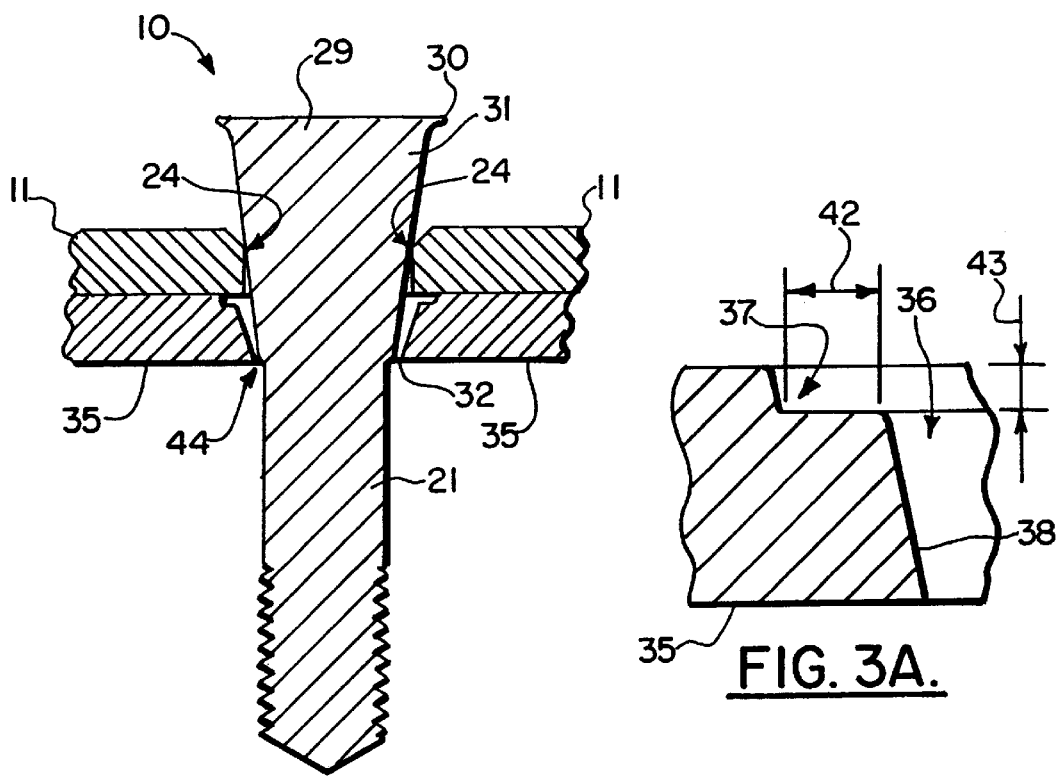
FIG. 3.    FIG. 3A.

FRICTION PULL PLUG WELDING: DUAL CHAMFERED PLATE HOLE

CROSS-REFERENCE TO RELATED APPLICATIONS

Priority of U.S. Provisional Patent Application Ser. No. 60/156,734, filed Sep. 30, 1999, incorporated herein by reference, is hereby claimed.

STATEMENT REGARDING FEDERALLY SPONSORED RESEARCH OR DEVELOPMENT

The invention described herein was made in the performance of work under NASA Contract No. NAS8-36200 and is subject to the provisions of Section 305 of the National Aeronautics and Space Act of 1958 (42 U.S.C. Section 2457).

The assignee is the owner of a copending patent application Ser. No. 09/141,294, filed Aug. 26, 1998, entitled "Friction Plug Welding," and incorporated herein by reference. For parameters not mentioned herein, see copending patent application Serial No. 09/141,294.

REFERENCE TO A "MICROFICHE APPENDIX"

Not applicable

BACKGROUND OF THE INVENTION

1. Field of the Invention

The present invention relates to friction welding. More particularly, the present invention provides an improved method and apparatus that relates to friction plug welding suitable for flight hardware usage. More particularly, the present invention relates to an improved friction pull plug welding process that uses a chamfered or beveled plate opening and a frustoconical surface on the plug with a different chamfer or bevel, and preferably a dual chamfered plate hole arrangement at the defect site.

2. General Background of the Invention

Friction stir welding (FSW) is a solid state joining process developed by The Welding Institute (TWI), Cambridge, England and described in U.S. Pat. No. 5,460,317, incorporated herein by reference. Also incorporated herein by reference are U.S. Pat. No. 5,718,366 and all references disclosed therein.

The following references are also incorporated herein by reference: U.S. Pat. Nos. 3,853,258, 3,495,321, 3,234,643, 4,087,038, 3,973,715 ,3,848,389; British Patent Specification No. 575,556; SU Patent No. 660,801; German Patent No. 447,084, "New Process to Cut Underwater Repair Costs", TWI Connect, No. 29, January 1992; "Innovator's Notebook", Eureka Transfer Technology, October 1991, p. 13; "Repairing Welds With Friction-Bonded Plugs", NASA Tech. Briefs, September 1996, p. 95; "Repairing Welds With Friction-Bonded Plugs", Technical Support Package, NASA Tech. Briefs, MFS-30102; "2195 Aluminum-Copper-Lithium Friction Plug Welding Development", AeroMat '97 Abstract; "Welding, Brazing and Soldering", Friction welding section: "Joint Design", "Conical Joints", Metals Handbook: Ninth Edition, Vol. 6, p. 726.

Friction plug welding (FPW), also referred to as plug welding and friction taper plug welding (FTPW), is a process in which initial defective weld material is located, removed and replaced by a tapered plug, which is friction welded into place. This process is similar to friction stud welding, in which a plug is welded to the surface of a plate, end of a rod, or other material. The primary difference is that FPW is designed to replace a relatively large volume of material containing a defect whereas friction stud welding is a surface-joining technique.

Friction plug welding could be used to repair weld defects in a wide variety of applications; however, it would most likely be used where weld strength is critical. This is due to the fact that manual weld repairs result in strengths much lower than original weld strengths, as opposed to friction plug welds (FPWs) whose typical mechanical properties exceed that of the initial weld. In applications where high strength is not required, manual welding would be less expensive and would not require specialized equipment.

An extension of FPW is known as stitch welding or friction tapered stitch welding (FTSW) and has been developed to repair defects longer than what a single plug can eliminate. Stitch welding is the linear sequential welding of several plugs such that the last plug weld partially overlaps the previous plug. Defects of indefinite length can be repaired with this process, limited only to the time and cost of performing multiple plug welds. These welds have undergone the same testing procedures as single FPWs, including NDI and destructive evaluation. The strengths for stitch welds are similar to those for single plug welds.

Stagger stitch welding is a process best defined as stitch welding in a non-linear fashion. Areas wider than one plug length can be completely covered by staggering plugs side to side as they progress down the length of an initial weld. This process is being developed for plug welds whose minor diameter is on the crown side of the initial weld, and where replacement of the entire initial weld is desired.

While friction plug welding might be a preferred method of repairing defects or strengthening initial welds, there are some applications where heretofore it has been extremely difficult to use friction plug welding. The main cause is due to the logistics of setting up the equipment and/or support tooling to perform friction plug welding, and the geometry of the work piece to be welded.

BRIEF SUMMARY OF THE INVENTION

The apparatus of the present invention solves the problems confronted in the art in a simple and straightforward manner. What is provided is an apparatus for and a method of friction plug welding an article using a plug and the formed opening at the defect each have a geometry that facilitates a good weld when the plug is pulled.

The present invention includes a method of friction plug welding an article, comprising several stages. Preferably, the first stage is making a hole (that is preferably tapered) in the article to be welded. Machining a tapered hole is not necessarily required in friction plug push welding where (in certain situations generally characterized when the article to be welded is softer (having lower hardness) relative to the harder (having higher hardness) plug) the plug will form a hole, self bore or embed into the material either while rotating or not. A tapered plug is then inserted through the tapered hole, then the plug is attached to a chuck of a rotary tool or like motor which can both pull on the tapered plug and rotate it. Some connection means, such as threads, key grooves, flats, or locking retention interface, are provided on the tapered plug to facilitate pulling the plug with the rotary tool.

The second stage, or heating cycle is always required to weld the plug to the article. This stage preferably consists of rotating the plug while pulling (placing the plug in tension axially) into intimate contact with the hole's surface, or region surrounding the hole. The typical axial load exerted on the plug during the heating phase is between about 1000 pounds and 20,000 pounds, preferably between about 6000 pounds and 18,000 pounds, more preferably 10,000 pounds to 16,000 pounds, and most preferably 12,500 pounds to 15,000 pounds.

Other forms of heating may also be utilized, including but not limited to, using electricity to assist in the heating process, or vibrational energy such as oscillatory rotation rather than the preferred method of continuous rotation, or lateral, axial or some combination thereof, rapid displacement (such as ultrasonic welding) to impart sufficient energy to assist in the heating the weldment. The plug (preferably tapered, with a taper the same as or preferably different from the taper of the hole (if it is tapered), and rotating the plug relative to the part while moving the plug in the direction such to make contact with the hole's surface, until contact is made, and forcing the plug into the surface of the hole by pulling on the plug (imposing a tensile force in the plug in the plug's axial direction) all while continuously spinning the plug relative to the article.

The third stage is the braking stage. This rapid deceleration of rotation, if rotation is used, or otherwise defined as rapid decline of energy input to zero or near zero, is necessary to performing a successful weld. Preferably, the fourth stage which is also referred to as the forging stage, is a period of cooling in which no further heating energy is intentionally applied to the weldment and energy in the form of heat is dissipated. During this stage, it is preferable to maintain either the same axial tensile load, or a different axial tensile load whether that be greater or lesser, to cause densification and or maintain or create a sound metallurgical bond or weldment. In the current application, although not necessarily required in other applications, excess sections of the plug are cut off and material further removed via grinding and sanding to make it smooth with the initial weldment and/or surrounding materials' surfaces. The present invention also includes the plug.

The displacement during heating should be optimized for the specific plug geometry and hole geometry combination being welded. Pull plug configuration is the subject of copending patent application Ser. No. 60/153,750, entitled "Friction Pull Plug Welding: Top Hat Plug Design", which is incorporated herein by reference.

In the preferred embodiment of the method of the present invention, a tapered hole is drilled from one side of the article being repaired. A tapered plug is then inserted through the tapered hole, then the plug is attached to a chuck of a motor which can both pull on the tapered plug and spin it. Some connection means, such as threads or locking retention interface, are provided on the tapered plug to facilitate pulling the plug.

The plug is pulled while spun by the motor. Preferably the plug is pulled also after the spinning stops, with a load the same as or different from the load while spinning. After the spinning has taken place and the plug is welded in place, the excess part of the plug is cut off and the weld machined down to make it smooth. Pulling a tapered plug during plug welding allows all equipment, including a backing plate, to be on one side of the article being welded. Pull welding eliminates the need for large backing structures that must react high loads associated with friction plug push welding, often exceeding 10,000 pounds force, while at the same loads deflect an amount often less than 0.25 inches.

A hydraulically powered direct drive weld has been used; however, an electrically powered direct drive, or inertia drive flywheel weld system may also be used.

The inventors have discovered that satisfactory welds occur most frequently when the plug diameter is large enough to maintain a mechanically stable cool core. For this reason, plug diameters have continued to increase, and more powerful weld equipment has been acquired. Techniques have been developed to weld larger diameter plugs while minimizing the required motor power. One such discovery entails varying the axial stroke rate during the weld process to decrease the initial contact friction. In this process, it is preferable for the plug and article to contact slowly, thereby reducing the rotational friction at contact. After the boundary between the plug and article plasticizes, then it is preferable, although not required, to increase the stroke rate, thereby increasing the rate of heating at the interface to achieve weld temperatures. This discovery significantly reduces the required power to perform welds, and is advantageous in performing large welds whose power requirement exceeds that which the system is designed to deliver.

The inventors have found that with their current equipment and process, the preferable operating range at which to rotate the plug is 4000–6000 rpm prior to contact between the plug and hole's surface, and it is also preferable to maintain a minimum of 3000 rpm during the duration of the heating cycle. Successful welds have been created at much slower speeds, as low as but not limited to 1000 rpm prior to contact and as high as, but limited only by the equipment capability, of about 7000 rpm prior to contact.

The plug of the present invention preferably has a connection means that can, for example, comprise a standard external thread. The thread can be, for example, right-hand ¾" with 16 threads per inch. Other methods for holding the plug in the chuck may also include internal threads and key grooves or like interfitting or interconnecting arrangement. The plug cooperates with a dual chamfered hole that eliminates plug rotational stalling, both upon initial plug/plate contact and during welding.

The dual chamfered plate hole arrangement of the present invention introduces a line contact between the plug and plate upon initial welding contact, as contrasted to a full area contact of the matching plug/plate angle. By limiting the initial contact area, torsional requirements for successful welding are significantly reduced, enhancing process robustness and personnel safety. With the initial line contact, a limited amount of pre-heated plastic material quickly flows along the interface allowing for the weld process to proceed quite rapidly. Faster ram speeds, which produce higher strength welds, as proven with extensive experimental testing and data, can only be obtained with such an improved dual chamfered hole and plug geometry. With the present invention, the plug provides a tapered surface (e.g. frustoconical) that does not match the angle of the plate chamfer. Also, the chamfer of the plate does not have to extend completely through the plate.

By changing the position of the angular transition through the plate thickness, the heat profile of both the plate and the plug can be significantly modified. Also, a variance of the angle and diameter of the hole chamfer changes the amount of plate material displaced during welding. The combination of the above two factors has been experimentally demonstrated to eliminate necking of the plug on the outside skin line (OSL) side of the weld.

The hole diameter ($D1$) has been varied through a range of 0.625 inches up to 1.125 inches, while the diameter of the top chamfer ($D2$) has been varied from 0.625 inches up to 1.250 inches. The Top Chamfer Angle ($A1$) has been varied through the range of 0 to 120 degrees, however the Bottom Chamfer Angle (A2) has been kept at 0 degrees through all testing to date. The depth of the chamfer (H) has been modified by both changing the chamfer angle while maintaining a constant D1, and also through a variance of D1 with a single chamfer angle.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 1 a fragmentary, perspective view of the preferred embodiment of the apparatus of the present invention;

FIGS. 3–3A are fragmentary, elevational views of the preferred embodiment of the apparatus of the present invention showing line contact between the pull plug and plate hole;

DETAILED DESCRIPTION OF THE INVENTION

Friction plug welding hole geometries are an important factor to creating a successful weld. A hole can be made by mechanically removing the weld bead flush to the top and bottom sides or the surrounding plate or sheet, drilling a pilot hole, and counter sinking with a counter sink cutter. The current included angle is typically 20° to 120°, preferably 40° to 90°, and most preferably 40° to 60°, although it is possible to perform similar welds with no angle (a straight bored hole), or opposite bored tapers (those which the taper of the plug and hole are opposing each other).

The hole is drilled to a depth such that the minor diameter is 0.00" to 0.200" greater in diameter than the diameter of the plug's shaft. The major diameter of the plug is typically equal to or greater than the major diameter of the hole. Current shaft diameters have ranged from ⅝" to ¾" in diameter; however, diameters ranging from between 1" and 1.5" are planned. Current plug major diameters (the diameter on the larger side of the taper) typically range from 1" to 1.35", but have been made less than ¾" and may be made in excess of 1.5". The plug body included angle, before the annular surface transition to the top hat, ranges from 10° to 90°, most preferably between 15° to 60°.

Figure 2:
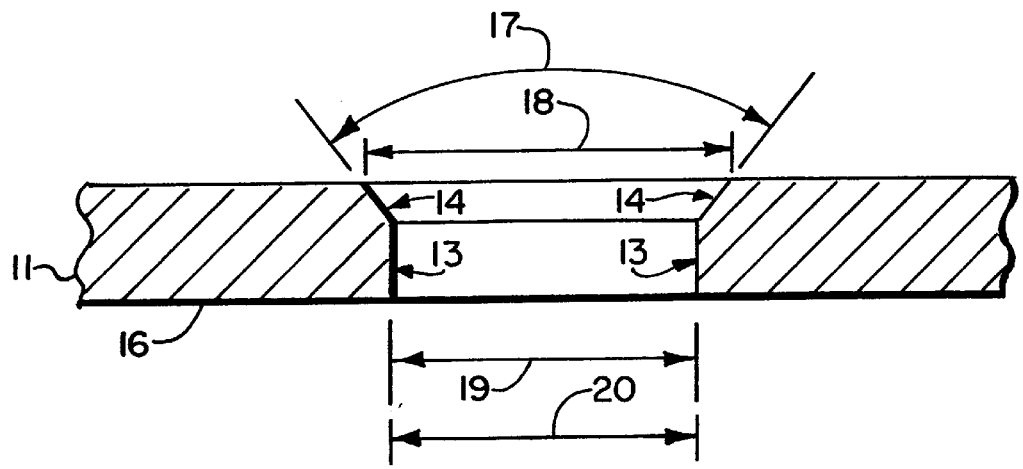
FIG. 2 is a fragmentary, sectional elevation view of the preferred embodiment of the apparatus of the present invention showing the plate hole configuration.
Figure 2A:
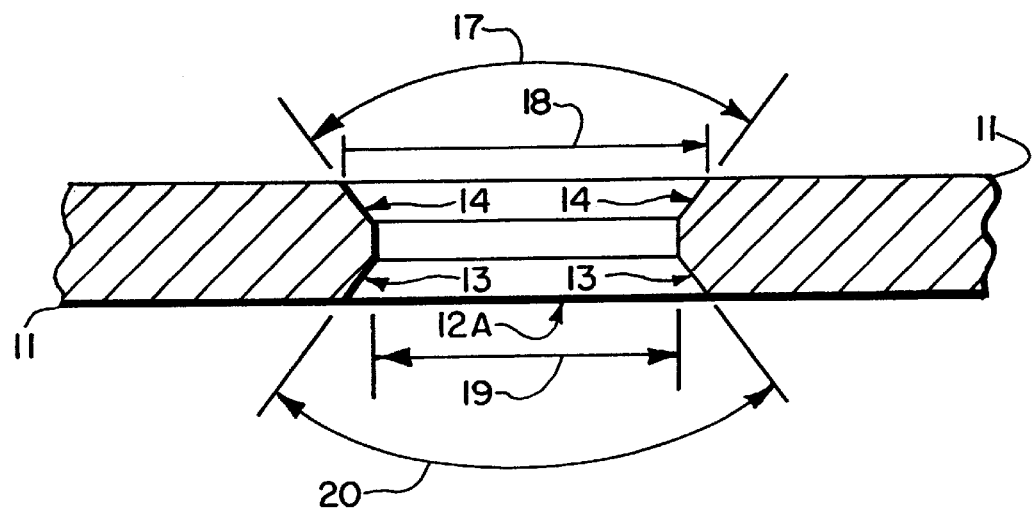
FIG. 2A is a fragmentary section view of the preferred embodiment of the apparatus of the present invention showing another plate hole configuration.
Figure 4:
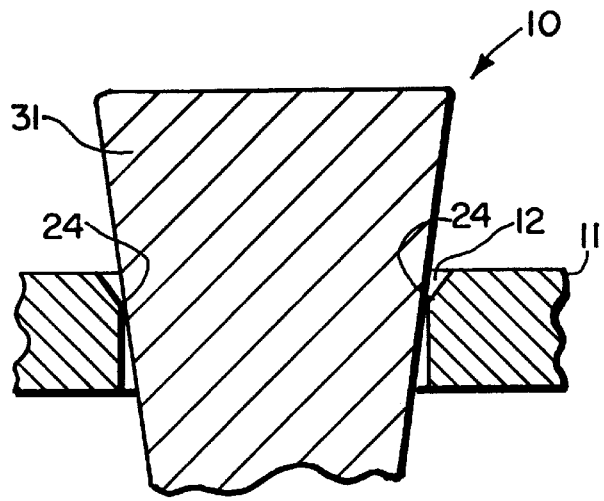
FIG. 4 is a sectional, elevational view of the preferred embodiment of the apparatus of the present invention illustrating a demonstration weld with the process stopped after initial contact.

FIGS. 1–4 show the preferred embodiment of the apparatus of the present invention, designated generally by the numeral 10 in FIGS. 3–4. Pull plug 10 in FIGS. 3 and 4 is shown placed in opening 12 in plate 11. Plate 11 can have opposed generally flat surfaces including surface 15 that defines an inside skin line surface and surface 16 which defines an outside skin line surface. In FIG. 1, plate opening 12 is comprised of a cylindrical wall 13 and a chamfer surface 14 as shown in FIG. 2. The opening 12 in FIG. 2 is defined by an angle 17, a diameter 18, a diameter 19 and an angle designated by the numeral 20 (See also FIG. 2A for a dual chamfer opening 12A). In FIGS. 1, 3 and 4, an initial line contact between plug 10 and plate 11 at opening 12 is designated by the numeral 24. Plug 10 has an enlarged head 29 that includes frustoconical section 31 and can optionally include enlarged diameter annular rim 30 (see FIG. 3). Annular rim 30 can be a tapered annular shoulder portion (as shown in FIG. 3) of head 29, and which is more particularly shown and described in copending application Ser. No. 09/545,980. An annular shoulder 32 can be provided between shank 21 and frustoconical section 31.

Figure 6:
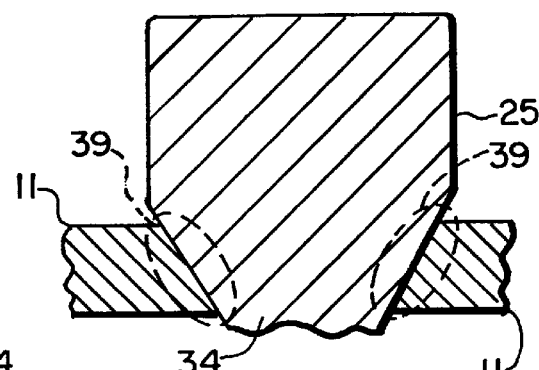
FIG. 6 is a schematic, elevational view showing surface rotational stall for the plug.
Figure 5:
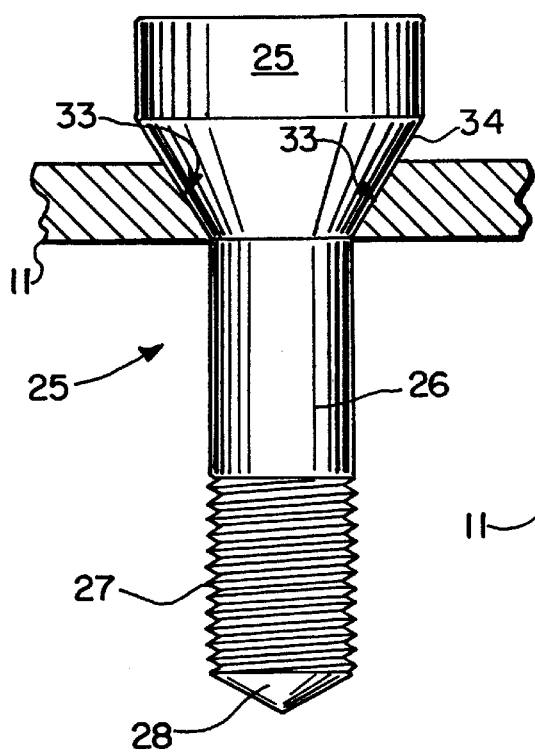
FIG. 5 is a sectional, elevation view illustrating a matching pull plug and plate hole chamfer angle.
Figure 7:
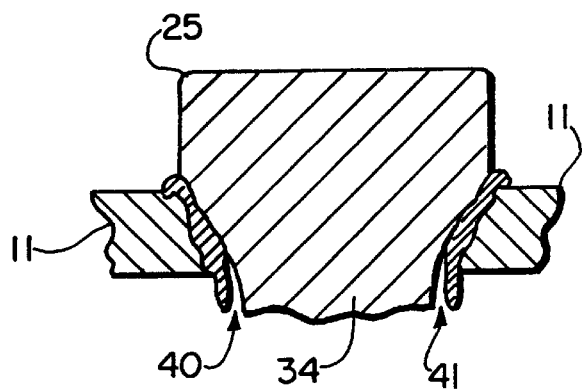
FIG. 7 is a sectional elevational view illustrating pull plug necking and hole of FIG. 5.

In FIGS. 5–7, a matching plug 25 and plate hole chamfer angle is shown to illustrate possible problems with such a design. In FIG. 5, the plug 25 has shank 26, threaded section 27 and conical end 28. The plate 11 has large contact areas 33 engaged by frustoconical section 34 of plug 25. In FIGS. 6–7, problems can occur that prevent a good bond. In FIG. 6, the areas designated by the numeral 39 are contact areas that are large areas surrounded by phantom lines. Such large contact areas can lead to surface rotational stall. In FIG. 7, the same large contact surface areas can cause pull plug necking at 40, 41.

In FIG. 3, the line of contact 24 with the plugs 10, 10A of the present invention is defined by the frustoconical portion 31 of pull plug 10 or 10A and an annular edge which is at the intersection of cylindrical wall 13 and chamfer 14.

Tension applied to a plug 10 is preferably 6,000–18,000 lbs, more preferably 10000–15000 lbs, and most preferably 12,500–15,000 lbs. During the application of such tension, the plug 10 or 10A is preferably rotated at least 4,000 revolutions per minute, more preferably at least 5000 RPM, most preferably at least 6000 RPM, and perhaps even higher with proper equipment. The inventors have found that reliability and robustness increase with increasing RPM.

The forging phase for typical weld geometry exerts an axial tensile load of typically 1,000 pounds to 20,000 pounds, preferably 6,000 pounds to 16,000 pounds, more preferably 8,000 pounds to 15,000 pounds, and most preferably 12,000 pounds to 14,000 pounds, as the weld cools. After several seconds, (typically less than one minute, preferably about 5 seconds), the weld has cooled sufficiently to remove the tensile load and remove the tooling and weld equipment.

The advantage of pulling instead of pushing is that all equipment can be placed on one side of the object being repaired (such as the rather large and fragile external tank of the space shuttle). This makes the logistics of performing a plug weld much easier in some cases than if standard plug push welding were to be performed.

The typical maximum temperature for this process, using typical process parameters, using aluminum alloys is 900° F. as measured by an embedded thermocouple located within 0.100" from the original interface at an approximate depth of 33% to 50% through the substrate's thickness. The first cycle ends after a pre-programmed time (typically less than 5 seconds, preferably from 0.25 seconds to 2 seconds, more preferably from 0.5 seconds to 2 seconds, and most preferably in about 1 second), displacement during heating (also referred to as 'burn-off') (typically 0.010 inches to 0.5 inches, preferably 0.150 inches to 0.400 inches, more preferably 0.200 inches to 0.350 inches, and most preferably 0.250 inches to 0.300 inches), or temperature (typically 500° F. to 1000° F., preferably 700° F. to 1000° F. as measured with an imbedded thermocouple within 0.1" of the original interface buried up to a depth of about 50% through the substrate's thickness.

In FIG. 3, the backing support 35 (also referred to as a backing plate, pressure foot, or collet) is another important aspect in forming a successful weld. It reacts the axial load, and also serves as a restraint to forge the extruded flash. The depth, diameter and profile of this support 35 can be optimized for each set of conditions, e.g. weld parameters, plug/hole geometrical design, plate thickness. In the pull method, the backing support 35 (also referred to as a backing plate or pressure foot) consists of a collet of an appropriate diameter and geometry. Currently, the diameter of the collet or opening 36 is larger than the shaft of the plug that passes through it by a gap 44 of at least 0.002", typically from 0.002" to 0.400", and preferably from 0.100" to 0.325". The profile of the collet 36 (see FIGS. 3–3A) may include a bevel, taper, groove 37 or other type of depression to act as a reservoir for plasticized material to flow. Successful welds have been made with tapered backing supports 35, with a taper angle between 0° and 60°, most typically between 20° and 40°. In FIGS. 3–3A, backing plate 35 has collet or opening 36, frustoconical surface 38 and annular groove 37 that functions as a reservoir. Groove 37 can have a width 42 between about 0 and 0.1 inches and a depth of between about 0 and 0.1 inches.

The present inventors use or contemplate using plug welding (push and/or pull) with 2195 Al—Cu—Li alloy and 2219 Al—Cu alloy. Development of plug welding includes plugs (for example) of extruded Al—Cu—Li 2195 in the T3, T8, and T8 overage condition welded into (1) Al 2195-T8 sheet, extrusion and plate, (2) 2195-T8/2195-T8 fusion welded sheet, extrusion and plate with Al 4043 filler wire, (3) 2195-T8/2219-T8 fusion welded sheet, extrusion and plate with Al 4043 filler wire, (4) 2219-T8/2219-T8 fusion welded sheet, extrusion and plate with Al 4043 filler wire, (5) 2219-T8/2219-T8 fusion welded sheet, extrusion and plate with Al 2319 filler wire, (6) friction stir welded 2195-T8/2195-T8 sheet and plate, where all sheets and plates were of thicknesses greater than 0.12" and no greater than 1.00" and all plugs were a diameter between 0.500" and 1.500".

The hole diameter (D1) has been varied through a range of 0.625 inches up to 1.125 inches, while the diameter of the top chamfer (D2) has been varied from 0.625 inches up to 1.250 inches. The Top Chamfer Angle (A1) has been varied through the range of 0 to 120 degrees, however the Bottom Chamfer Angle (A2) has been kept at 0 degrees through all testing to date, but could be between about 0–120°. The depth of the chamfer (H) has been modified by both changing the chamfer angle while maintaining a constant D1, and also through a variance of D1 with a single chamfer angle. This geometry is seen in FIGS. 3–3A.

An application of the Friction Pull Plug Welding Dual Chamfered Plate Hole Design is for solid state repair welding of welded pressure vessels utilized in the aerospace industry. This process would also be useful in any application where a defect free, high strength, circular weld of up to about 1" diameter is required. This process could also be readily utilized to repair the Friction Stir Welding exit keyhole on circumferential welds. Other applications could be found throughout the automotive, aircraft, marine, and aerospace industries.

The "chamfered" plate hole extends through the plate thickness and has a matching angle to the plug (see FIG. 5).

The "dual chamfered" opening does not have a matching angle to the plug and the chamfer does not extend through the entire thickness of the plate (see FIG. 3).

This application could be utilized in all other alloy systems or metal matrix composites.

PARTS LIST

The following is a list of parts and materials suitable for use in the present invention:

| Part Number | Description |
|---|---|
| 10 | pull plug |
| 11 | plate |
| 12 | opening |
| 12A | opening |
| 13 | cylindrical wall |
| 14 | chamfer surface |
| 15 | ISL surface |
| 16 | OSL surface |
| 17 | angle |
| 18 | diameter |
| 19 | diameter |
| 20 | angle |
| 21 | shank |
| 22 | threaded portion |
| 23 | end |
| 24 | initial line contact |
| 25 | pull plug |
| 26 | shank |
| 27 | threaded section |
| 28 | end |
| 29 | head |
| 30 | enlarged diameter annular rim |
| 31 | frustoconical section |
| 32 | annular shoulder |
| 33 | contact area |
| 34 | frustoconical section |
| 35 | backing plate |
| 36 | backing plate opening |
| 37 | annular groove |
| 38 | frustoconical surface |
| 39 | contact area |
| 40 | pull plug necking |
| 41 | pull plug necking |
| 42 | width arrow |
| 43 | depth arrow |
| 44 | gap |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

What is claimed is:

1. A method of friction plug welding repair comprising the steps of:
   a) locating a defect in a weld that joins two sections of material together;
   b) removing weld material at the defect to form a tapered opening that has a chamfer said opening being open ended at both end portions;
   c) placing a plug through the opening, wherein the plug has top and bottom end portions, the top end portion being tapered and larger in diameter than the opening, wherein the top end portion has two sections including a gradually tapering section and a rapidly tapering section defining the maximum diameter of the top end portion;

d) pulling the bottom end portion of the plug so that the top end portion of the plug engages the opening;

e) rotating the plug with sufficient revolutions per unit time that the combined effect of the rapidly tapering section of the plug top end enables the plug to heat up and provide radial and axial pressure.

2. The method of claim 1 wherein in step "c", the plug top end portions includes two separate sections including a frustoconical smaller diameter section and a larger diameter section.

3. The method of claim 1 wherein the defect in step "a" is less than one inch in length.

4. The method of claim 1, further comprising the step of placing a backing plate member against the sections of material to be welded together.

5. The method of claim 1 wherein step "b" includes drilling a hole to form the opening.

6. The method of claim 1 wherein the opening formed in step "b" is a dual chamfered plate opening.

7. The method of claim 1 wherein the chamfer angle is between 0 and 120 degrees for at least one of the chamfers.

8. The method of claim 6 wherein the opening has a maximum diameter, and the top en portion of the plug has a section with a diameter larger than said opening maximum diameter.

9. The method of claim 1 wherein the plug top end portion has a gradually tapering section along a majority of the length of the top end portion, and a rapidly tapering section of maximum diameter that extends over a minority of the length of the top end portion.

10. The method of claim 1 wherein the top end portion includes an annular curved surface.

11. A method of friction plug welding repair comprising the steps of:

a) locating a defect in a weld that joins two sections of material together;

b) removing weld material at the defect to form an open ended opening that includes a tapered portion that extends a partial distance through the weld material;

c) placing a plug in the opening, wherein the plug has top and bottom end portions, the bottom end portion extending through the opening, the top end portion being tapered and larger in diameter than the opening, wherein the top end portion has two sections including a gradually tapering section and a rapidly tapering section defining the maximum diameter of the top end portion;

d) pulling the bottom end portion of the plug so that the top end portion of the plug engages the opening;

e) rotating the plug with sufficient revolutions per unit time that the combined effect of the rapidly tapering section of the plug top end enables the plug to heat up and provide radial and axial pressure.

12. A method of friction plug welding repair comprising the steps of:

a) locating a defect in a weld that joins two sections of material together;

b) removing weld material at the defect to form an open ended opening that has at least one annular chamfered portion;

c) placing a plug in the opening, the plug having top and bottom end portions, the bottom end portion extending through the opening, the top end portion being generally frustoconically shaped at least in part, the top end portion having an enlarged diameter tapered portion that is larger in diameter than the frustoconical section's largest diameter;

d) pulling the bottom end portion of the plug so that the top end portion of the plug engages the opening; and e) rotating the plug with sufficient revolutions per unit time that the combined effect of the enlarged diameter of the plug at the top end enables the plug to heat up the plug top, and wherein the plug top provides radial and axial pressure.

13. The method of claim 12 wherein the plug is rotated in step "e" at between 1,000 and 7,000 revolutions per minute.

14. The method of claim 12 wherein the plug is pulled in step "d" with a tension of between 1,000 and 20,000 pounds.

15. The method of claim 15 wherein the opening in step "b" is a dual chamfered opening.

16. A method of friction plug welding repair comprising the steps of:

a) locating a defect in a weld that joins two sections of material together;

b) removing weld material at the defect to form an opening that includes a tapered portion;

c) placing a plug having first and second end portions in the opening, the first end of the plug having a tapered plug portion;

d) pulling the second end portion of the plug so that the first end portion of the plug engages the opening; and e) rotating the plug with sufficient revolutions per unit time that the combined effect of the enlarged diameter of the plug at the first end enables the plug to heat up the plug first end portion, and wherein the plug first end portion provides radial and axial pressure.

17. The method of claim 16 wherein there is a chamfered portion at the opening.

18. The method of claim 16 wherein there is a dual chamfered portion at the opening.

19. The method of claim 16 wherein the taper of the opening and the taper of the plug are different.

* * * * *